United States Patent [19]

Yuen

[11] Patent Number: 5,812,931

[45] Date of Patent: Sep. 22, 1998

[54] TWO-WAY INTERACTIVE TELEVISION SYSTEM INCORPORATING PAGER TRANSMITTER AND RECEIVER FOR CONDUCTING MESSAGING WITH INFORMATION PROVIDER

[76] Inventor: Henry C. Yuen, P.O. Box 1159, Redondo Beach, Calif. 90278

[21] Appl. No.: 879,146

[22] Filed: Jun. 19, 1997

Related U.S. Application Data

[60] Provisional application No. 60/012,146 Feb. 23, 1996 and provisional application No. 028,555 Oct. 15, 1996.

[30] Foreign Application Priority Data

Feb. 21, 1997 [WO] WIPO .................... PCT/US97/02642

[51] Int. Cl.$^6$ ................. H04H 1/00; H04H 7/14
[52] U.S. Cl. .................. 455/5.1; 348/7; 348/10; 348/12; 345/327; 455/6.2
[58] Field of Search .................. 455/2, 3.1, 4.1, 455/4.2, 5.1, 6.1, 6.2; 348/1, 2, 6, 7, 8, 10, 11, 12, 13; 345/326, 327; 395/200.47, 200.48, 200.49; H04N 7/10, 7/14, 7/173

[56] References Cited

U.S. PATENT DOCUMENTS

| | | | |
|---|---|---|---|
| 4,750,036 | 6/1988 | Martinez | 358/147 |
| 5,036,389 | 7/1991 | Morales | 358/84 |
| 5,357,276 | 10/1994 | Banker et al. | 348/7 |
| 5,592,551 | 1/1997 | Lett et al. | 380/20 |
| 5,708,961 | 1/1998 | Hylton et al. | 455/4.2 |
| 5,708,963 | 1/1998 | Mobley et al. | 455/12.1 |

OTHER PUBLICATIONS

Written Opinion issued by IPEA in corresponding PCT application (PCT/US97/02642).

*Primary Examiner*—Mark R. Powell
*Assistant Examiner*—John W. Miller
*Attorney, Agent, or Firm*—Christie, Parker & Hale, LLP

[57] ABSTRACT

A system for two-way communication between a television viewer operating a remote control unit to control a television and a television signal or other information provider located at a central site. A set-top box coupled to the television includes an infrared receiver to receive command signals from the remote control unit, a pager transmitter to transmit messages to the television signal or other information provider, and a pager receiver to receive confirmation messages from the television signal or other information provider. Also included is a controller to control reception of command signals from the remote control unit, reception of a television signal, display of the television signal on the television, translation of the command signals into messages to be sent by the pager transmitter, reception of confirmation messages from the pager receiver, and display of received confirmation messages on the television. Alternatively, the infrared receiver, pager transmitter, pager receiver, and controller are integral with the television.

21 Claims, 2 Drawing Sheets

TWO-WAY INTERACTIVE TELEVISION SYSTEM INCORPORATING PAGER TRANSMITTER AND RECEIVER FOR CONDUCTING MESSAGING WITH INFORMATION PROVIDER

This application claims the benefit of U.S. Provisional Application Ser. No. 60/012,146, filed Feb. 23, 1996, U.S. Provisional Application Ser. No. 60/028,555, filed Oct. 15, 1996, and PCT Application No. PCT/US97/02642, filed Feb. 21, 1997.

BACKGROUND OF THE INVENTION

1. Field of the Invention

This invention relates generally to interactive television systems and more specifically to an interactive television system integrated with pager communications technology to allow two-way communication between the interactive television system and a central site.

2. Background

In the consumer television industry, there are many instances where two-way communications between a television signal provider at a central site and the television viewer is desired. In the case of over-the-air broadcast television, cable television, C-band satellite and direct satellite broadcasting, the link from the television signal provider to the television viewer is well established and has a wide bandwidth, and is capable of carrying a large amount of information (including both the television signals and other analog and digital information). A problem that consistently arises is how to establish a second communication link back from the television viewer to the television signal provider.

The most common solution to this problem is to use a telephone link. Many cable systems and direct broadcast satellite systems use this solution. One of the problems with using the telephone to provide the link from the television viewer to the television signal provider is that the television receiver (e.g., cable box, direct satellite receiver, or other set-top box) must either be positioned near a telephone jack or a telephone cable of considerable length must be strung from the receiver to the telephone jack. Another problem is that the telephone link cannot be used at the same time that the television viewer is using the telephone for normal telephone calls.

Other solutions that have been proposed include creating a new radio frequency (RF) system which would allow communication from the television viewer to the television signal provider through an RF link. This system, however, would require the creation of a new communications infrastructure covering vast geographic areas. Such a system may be prohibitively expensive to implement.

SUMMARY OF THE INVENTION

According to the present invention, the foregoing and other objects and advantages are attained by a system for providing a communications path from a viewer of a television controlled by a remote control unit to an information provider located at a central site. The system includes circuitry to receive a command signal from the remote control unit and to translate the command signal into a message to be relayed to the information provider. The command signal could be, for example, a command to purchase an advertised product or pay-per-view television event. A pager transmitter is included to transmit the message from the television viewer to the information provider over a wireless link. Additionally, a pager receiver may be included to receive a second message from the information provider over a second wireless link and circuitry is provided to take the received message and display it on the television screen as confirmation that the purchase command was received and accepted by the information provider. This two-way communications capability may be incorporated into a set-top box such as a cable television controller or video cassette recorder, or into a television.

In an embodiment of the present invention, a method of communicating between a television viewer and an information provider located at a central site includes the steps of displaying a prompt on a television to the television viewer requesting a viewer selection, accepting the viewer selection from the television viewer via a remote control unit for the television, VCR or set-top box, transmitting a command signal corresponding to the viewer selection from the remote control unit to the set-top box, translating the command signal into a pager message, and transmitting the pager message by a pager transmitter to the information provider over a wireless link.

Still other objects and advantages of the present invention will become readily apparent to those skilled in the art from the following detailed description, wherein is shown and described only the preferred embodiment of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE PREFERRED EMBODIMENT

Figure 1:
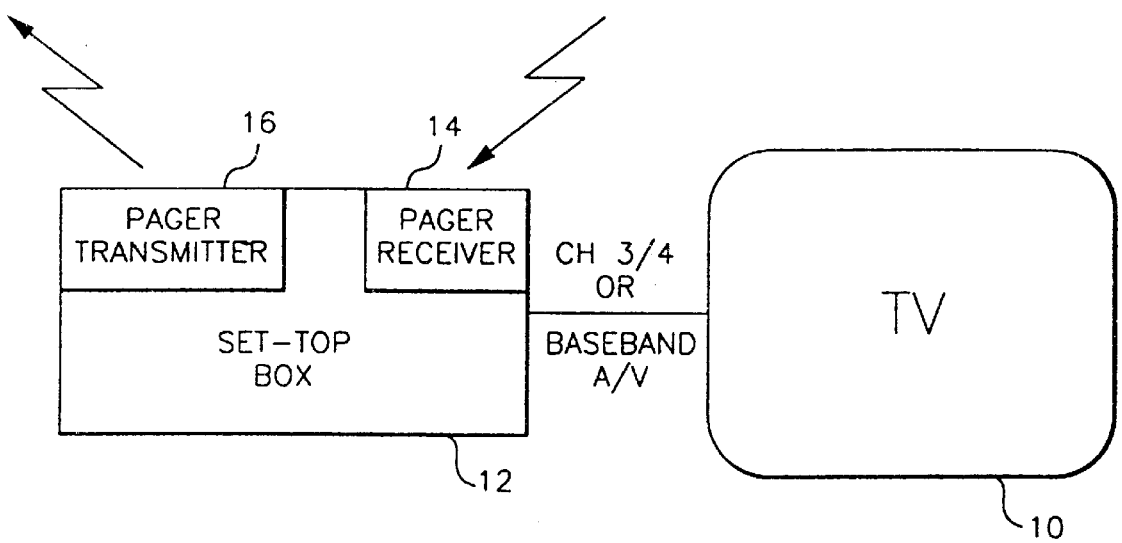
FIG. 1 is a block diagram showing a two-way interactive television system according to the present invention.

FIG. 1 is a block diagram showing a two-way interactive television system according to the present invention. In the preferred embodiment of the present invention, a television system includes a Television (TV) 10 connected to a Set-Top Box 12 via an RF connection using channels 3 or 4, a baseband video and audio connection, an S-video connection or any other conventional manner of communicating audio and video signals. In various embodiments, the Set-Top Box 12 could be a cable box, satellite receiver or any other type of consumer electronic device, such as a video cassette recorder (VCR) or a stand alone electronic program guide. The Set-Top Box 12 includes a Pager Transmitter 16 for sending information and may also include a Pager Receiver 14 for receiving information.

Figure 2:
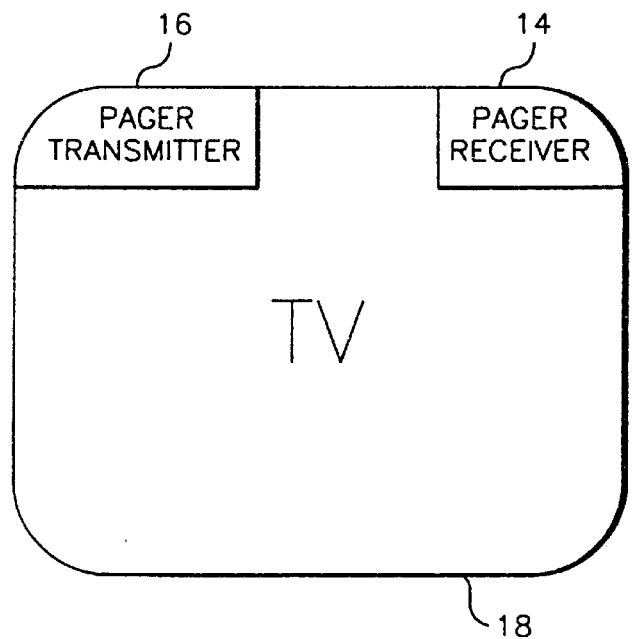
FIG. 2 is a block diagram showing an alternative embodiment of a television system according to the present invention.

FIG. 2 is a block diagram showing an alternative embodiment of a television system according to the present invention. In this embodiment, the Pager Transmitter 16 and Pager Receiver 14 are contained in the Television 18.

The preferred embodiment of the present invention uses two-way paging services to provide communications from the television viewer to the television signal provider. This system allows for the addition of a low cost pager transmitter into a television, set-top box or other consumer electronic device to provide communications from the television viewer back to the television signal provider. One advantage of this system is that it does not require the establishment of a new communications infrastructure as would the proposed RF systems.

Another advantage arising from the use of two-way paging services for communications from the television viewer to a television signal provider is that a low cost pager receiver could be added to the television, set-top box or other consumer electronic device to provide another communications path from the television signal provider to the television viewer.

In another alternative embodiment, a set-top box, television or other consumer electronic device can be equipped with both a pager transmitter and pager receiver of a two-way paging service system for communicating with an information provider other than a television signal provider. The type of information that could be communicated using this system would include any type of information that can be provided by modem to a personal computer, while using a television screen to display information and a native consumer electronic device (e.g., VCR, set-top box, television) remote control unit or universal remote control as an input device for the consumer.

Two-way paging, also known as acknowledgment paging, uses a set of radio channels allocated by the Federal Communications Commission (FCC) in the frequency spectrum at 900 MHZ. Two-way paging is also designated Narrowband Personal Communications Service (NPCS). It operates on a much wider spectrum than one-way paging and is therefore capable of transmitting larger amounts of information. Two-way paging expands paging beyond simple message notification to a comprehensive, integrated, and information-rich messaging service. Two-way paging uses an outbound communications channel for sending messages to the pager and an inbound communications channel for receiving pager responses. Examples of existing two-way paging services include SKYTEL TWO-WAY, available from SkyTel Corporation, and SKYPAGEII, available from Mobile Telecommunications Technologies Corporation. The pager hardware technology used by the SKYTEL2-WAY system is the TANGO pager available from Motorola, Inc. Examples of network protocols used in two-way paging services include the REFLEX family of network protocols from Motorola, Inc. and pACT technology available from ATT, Inc.

Figure 3:
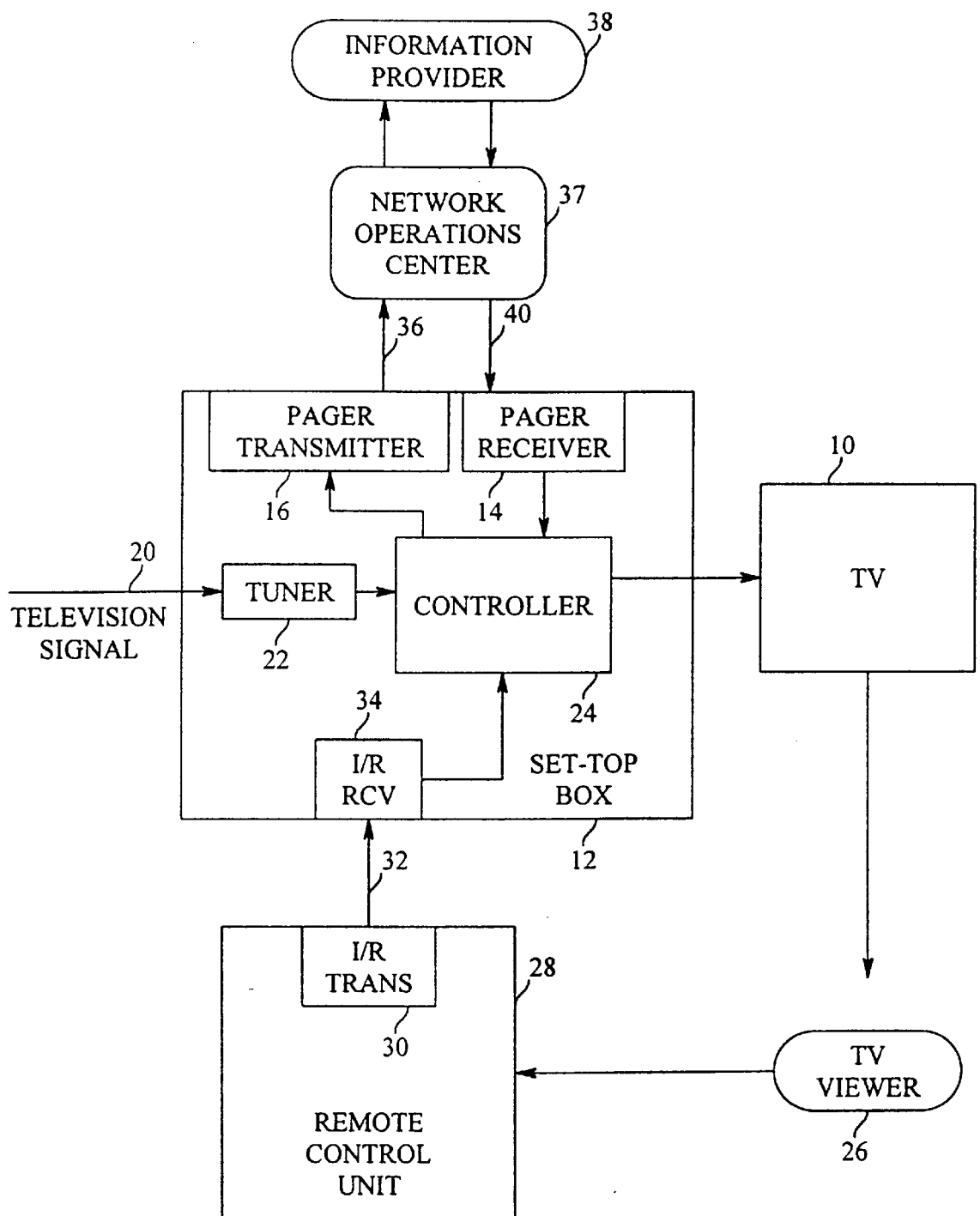
FIG. 3 is a block diagram of the present invention.

FIG. 3 is a block diagram of the present invention. A Television Signal 20 is input to the Set-Top Box 12 and processed by Tuner 22. The TV Signal can be received through an over-the-air antenna, by cable, by satellite reception or by any other conventional television communications medium. The tuned television program is sent by Controller 24 to the TV 10 for display to TV Viewer 26. In the preferred embodiment, the Controller 24 is a programmed microprocessor, although other control circuitry may be used. In a home shopping, pay-per-view, or other interactive television application, the television program shown on the TV prompts the TV Viewer 26 to make a selection or choice based on information presented on the TV screen. For example, the prompt may ask the TV Viewer 26 if he or she would like to purchase the right to view a pay-per-view event, purchase an advertised product, or respond to a survey question. To make a selection or send information back to the producer of the television program or other entity at a central site, the TV Viewer pushes an appropriate button (not shown) on the Remote Control Unit 28. The Remote Control Unit is a conventional remote control for a consumer electronics device such as a TV, VCR, and the like, having a plurality of buttons for user input. The Remote Control Unit senses the push of the button and sends a corresponding command signal via Infrared Transmitter (I/R TRANS) 30 over Infrared Link 32 to an Infrared Receiver (I/R RCV) 34 situated in the Set-Top Box 12. I/R RCV 34 forwards the command signal to the Controller 24 for processing. The Controller 24 directs Pager Transmitter 16 to send a message over Reverse Wireless Link 36 through Network Operations Center (NOC) 37 to an Information Provider 38. The message contains a unique viewer identifier, a data service identifier, and the viewer selection or response (e.g., a buy command). The data service identifier identifies the particular product being advertised or service being offered to the viewer. The Information Provider 38 may be a television station, broadcast or cable television network, advertiser, home shopping company, personal communications service network, or any other provider of information and services to the TV Viewer 26 via any communications medium.

Pager Transmitter 16 operates according to conventional two-way pager methods of operation in sending the message from the Set-Top Box 12 at the TV Viewer's location to the Information Provider 38 at a central site. Optionally, the Information Provider 38 sends a confirmation message in response to the TV Viewer's message over Forward Wireless Link 40 through Network Operations Center 37 to Pager Receiver 14. The confirmation message is forwarded to Controller 24 for display on TV 10, thereby providing immediate feedback to the TV Viewer that his or her selection was received and accepted.

The paging network used in the present invention is a high-speed packet switching network capable of sending and receiving at least hundreds of messages per minute. The network consists of two separate paths, forward and reverse, tied together by the Network Operations Center and personal messaging units (PMUs). In the preferred embodiment, the forward channel is shown as Forward Wireless Link 40, and the reverse channel is shown as Reverse Wireless Link 36. The components of a PMU are shown as Pager Transmitter 16 and Pager Receiver 14 incorporated into Set-Top Box 12. Pager Transmitter 16 and Pager Receiver can also be integrated into a single component within the Set-Top Box 12. An embodiment of a combined Pager Transmitter and Pager Receiver is the PAGEWRITER two-way messaging unit commercially available from Motorola, Inc. The PAGEWRITER system can communicate with other pagers, fax machines, or Internet e-mail addresses. In this embodiment, Pager Receiver 14 operates in the 940–941 MHz frequency bands, with 50 KHz channel spacing, and at bit rates of 6400 bps. It supports signaling with 4 level frequency shift keying (FSK) at 3200 bps and 6400 bps, with a frequency deviation of +/−800 Hz and +/−2400 Hz for 4 level operation. Pager Receiver also has a selectivity of 60 dB at +/−50 KHz. In this embodiment, Pager Transmitter 16 operates in the 901–902 MHz frequency bands, with 12.5 KHz channel spacing, and at bit rates of 9600 bps. It supports signaling with 4 level FSK at 800, 1600, 6400, and 9600 bps, with a frequency deviation of +/−800 Hz and +/−2400 Hz for 4 level operation.

The Forward Wireless Link 40 is a wide-area, simulcast system using four subchannels. Simulcasting is a method of radio frequency (RF) transmission that can cover very wide geographic areas by using multiple transmitters (not shown) operating on the same frequency with the same data over a given area. The forward channel distribution flows from the NOC via satellite-to-satellite downlinks located at each transmitter site. Each subchannel is modulated with four-level frequency-shift keying that operates at a speed of 6,400 bits per second. The channels can be used independently for high-capacity paging or combined for a throughput of 25,600 bits per second for delivering larger amounts of data to the Pager Receiver 14. This throughput is achieved by using well known multi-carrier modulation (MCM) technology combined with the REFLEX 50 paging protocol commercially available from Motorola, Inc.

The Reverse Wireless Link 36 connects Pager Transmitter 16 to a network of receivers (not shown). The receivers are connected to the NOC 37 via telephone lines and a frame-relay network. In a wide-area simulcast system, it is necessary to use multiple receivers scattered over a given area to ensure reverse channel coverage. Because the reverse channel Pager Transmitter 16 is directional, receivers must be spread so as to ensure there is a receiver available regardless of the position or location of the Pager Transmitter.

The Network Operations Center (NOC) 37 receives messages from Pager Transmitters, distributes the messages to Information Providers and other network users, collects confirmations and responses, and transmits them back to the message originators via Pager Receivers. In addition, the NOC automatically registers the location of the television viewer's Set-Top Box 12. With the present configuration, and using the four subchannels independently, the system capacity is in the range of 2 million to 3 million television viewers per NOC.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patent is set forth in the appended claims.

What is claimed is:

1. An apparatus for providing a communications path from a viewer of a television controlled by a remote control unit to an information provider located at a central site comprising:

means for receiving a command signal from the remote control unit operated by the television viewer and for translating the command signal into a message; and a pager transmitter coupled to the receiving and translating means to transmit the message to the information provider over a wireless link.

2. The apparatus of claim 1, further comprising a pager receiver to receive a second message from the information provider over a second wireless link and means for displaying the second message on the television.

3. An apparatus for controlling a television and for providing two-way communication between a television viewer operating a remote control unit and an information provider located at a central site comprising:

a pager transmitter to transmit a first message to the information provider over a first wireless link;

a pager receiver to receive a second message from the information provider over a second wireless link; and means coupled to the pager transmitter and the pager receiver for receiving a command signal from the remote control unit operated by the television viewer, for translating the command signal into the first message, and for displaying the second message on the television.

4. A television controlled by a remote control unit and including a communications path from a viewer of the television to an information provider located at a central site comprising:

means for receiving a command signal from the remote control unit operated by the television viewer and for translating the command signal into a message; and a pager transmitter coupled to the receiving and translating means to transmit the message to the information provider over a wireless link.

5. The television of claim 4, further comprising a pager receiver to receive a second message from the information provider over a second wireless link and means for displaying the second message on the television.

6. A system for two-way communication between a television viewer operating a remote control unit to control a television and a television signal provider located at a central site comprising:

an infrared receiver to receive a command signal from the remote control unit;

a pager transmitter to transmit a first message to the television signal provider over a first wireless link;

a pager receiver to receive a second message from the television signal provider over a second wireless link; and means coupled to the infrared receiver, the pager transmitter and the pager receiver for controlling reception of the command signal, reception of a television signal, display of the television signal on the television, translation of the command signal into the first message, transmission of the first message, and reception of the second message.

7. The system of claim 6, wherein the first message comprises a command to purchase a product advertised in a television program carried by the television signal.

8. The system of claim 7, wherein the first message comprises a viewer identifier, a data services identifier, and a viewer selection.

9. The system of claim 7, wherein the product is a pay-per-view television program.

10. The system of claim 7, wherein the second message comprises a confirmation signal confirming reception and acceptance of the first message by the information provider.

11. The system of claim 10, wherein the controlling means further comprises means for displaying the second message on the television.

12. The system of claim 6, wherein the system is integral with a cable set-top box.

13. The system of claim 6, wherein the system is integral with a satellite receiver.

14. The system of claim 6, wherein the system is integral with a video cassette recorder.

15. The system of claim 6, wherein the system is integral with a stand alone electronic program guide.

16. In a system having a set-top box for controlling a television, the set-top box having a pager transmitter and a pager receiver and accepting command signals from a remote control unit operated by a television viewer, a method of communicating between the television viewer and an information provider located at a central site comprising the steps of:

displaying a prompt on the television to the television viewer requesting a viewer selection;

accepting the viewer selection from the television viewer by the remote control unit;

transmitting a command signal corresponding to the viewer selection from the remote control unit to the set-top box;

translating the command signal into a first message; and transmitting the first message by the pager transmitter to the information provider over a first wireless link.

17. The method of claim 16, further comprising the steps of:

receiving a second message by the pager receiver over a second wireless link from the information provider; and displaying the second message on the television to the television viewer.

18. The method of claim 17, wherein the first message comprises a command to purchase a product advertised in a television program displayed by the television.

19. The method of claim 18, wherein the first message comprises a viewer identifier, a data services identifier, and a viewer selection.

20. The method of claim 19, wherein the product is a pay-per-view television program.

21. The method of claim 17, wherein the second message comprises a confirmation message confirming reception and acceptance of the first message by the information provider.

* * * * *